J. L. CREVELING.
ELECTRIC SYSTEM.
APPLICATION FILED AUG. 28, 1916.
1,332,610.
Patented Mar. 2, 1920.
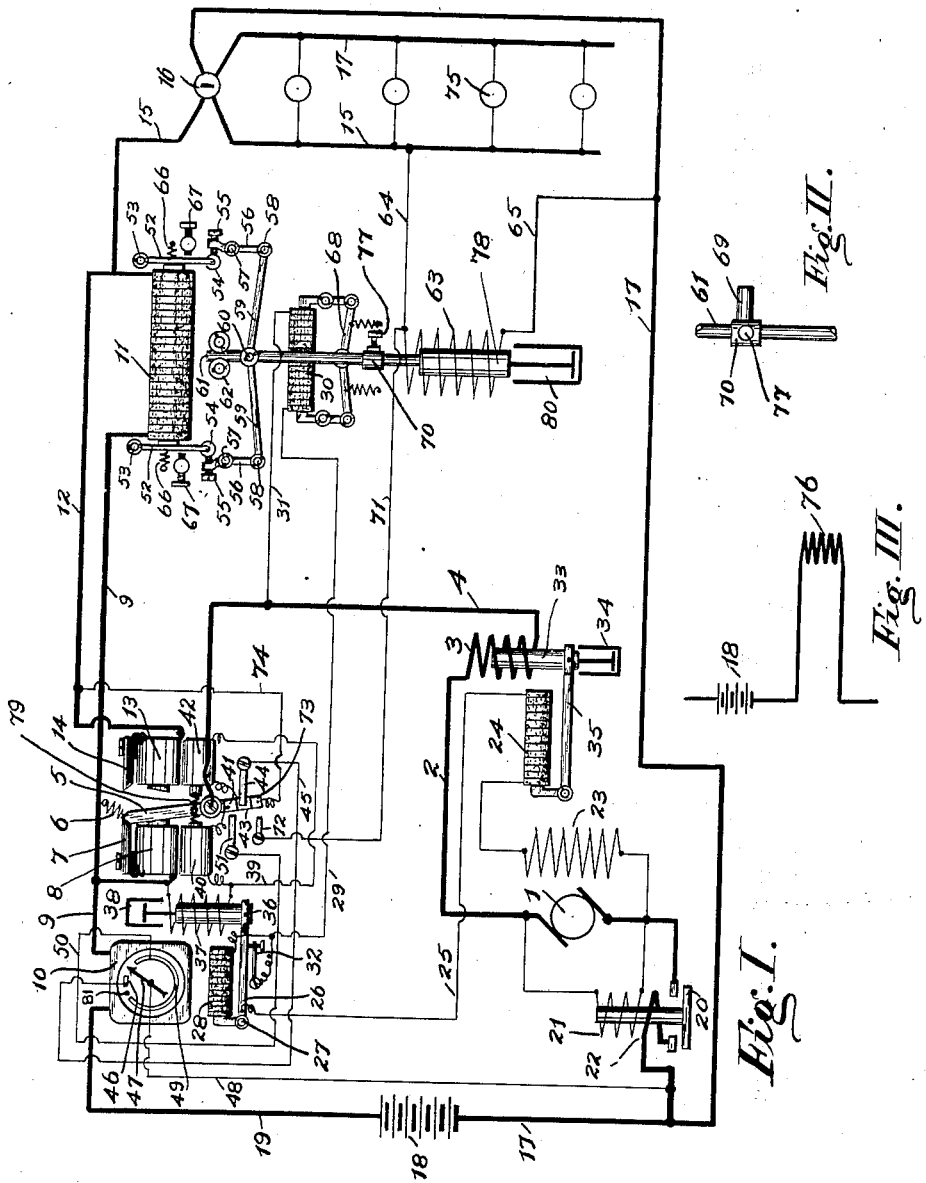
INVENTOR:
John L. Creveling

UNITED STATES PATENT OFFICE.

JOHN L. CREVELING, OF WHITE PLAINS, NEW YORK, ASSIGNOR TO GOULD COUPLER COMPANY, A CORPORATION OF NEW YORK.

ELECTRIC SYSTEM.

1,332,610.     Specification of Letters Patent.     Patented Mar. 2, 1920.

Application filed August 28, 1916. Serial No. 117,245.

*To all whom it may concern:*

Be it known that I, JOHN L. CREVELING, a citizen of the United States, residing in White Plains, county of Westchester, and State of New York, have invented certain new and useful Improvements in Electric Systems, of which the following is a description.

My invention is particularly applicable to that class of electric systems wherein it is desired to maintain translating devices by means of a storage battery and a coöperating source of electrical potential difference and wherein the source at times supplies current to the battery, and at times to the translating devices which devices are maintained by the battery when the said source is ineffective.

My invention has for a particular object to provide means whereby a system of the character above mentioned may be automatically operated.

In the drawing, Figure I. is a diagrammatic representation of an electric system which is shown for the purpose of explaining one type of system falling within the scope of my invention.

Fig. II. is an elevation of a portion of one of the devices indicated in Fig. I.

Fig. III. is a diagrammatic representation of a modification which may be made in the system shown in Fig. I.

In Fig. I., 1 represents a controllable source of electrical potential difference indicated as a generator, the positive brush of which is connected as by wire 2 with one end of a solenoid or winding 3, the opposite end of which is connected as by wire 4 with a switch lever 5 which is preferably made of magnetic material and urged in either one or the other of two definite positions by means of a snap spring indicated at 6. The lever 5 when in one of its fixed positions is in contact with a yielding member 7 electrically connected with the winding of an electromagnet 8 which when energized holds the lever 5 in the position indicated in the drawing in contact with the member 7.

The opposite terminal of the magnet 8 is connected with the lead 9, one end of which is connected with one of the terminals of any suitable metering device, as for example the ampere-hour-meter indicated at 10 and the functions of which will hereinafter appear. The opposite end of the lead 9 is carried to one terminal of a suitable translating circuit regulator, in this instance indicated as the carbon pile 11. The remaining terminal of the carbon pile 11 is connected with the lead 12 which is carried to one end of an electromagnet 13, the opposite terminal of which is connected with the insulated contact member 14. The electromagnet 13 and contact member 14 are similar to the magnet 8 and contact member 7, and when the lever 5 is in its second definite position the said lever causes contact with the member 14 and is held in that position by spring 6 and the magnet 13 if the same be excited, as will hereinafter more plainly appear.

The lead 12 is in connection with the lead 15 which may have in series therewith, if desired, a suitable switch as indicated at 16, and the said lead 15 is connected with the positive terminals of the lamps or other translating devices, indicated at 75. The negative terminals of the translating devices 75 are connected to the lead 17 which is carried to the negative terminal of the storage battery 18, the positive of which is carried as by lead 19 to the remaining terminal of the metering device or ampere-hour-meter 10.

The automatic switch 20 which is closed by the coil 21, which may be connected in shunt across the generator as indicated, connects the lead 17 through the holding coil 22 with the negative brush of the generator 1. The generator 1 may be provided with any suitable field exciting means, in this instance indicated as a winding or field coil 23 having one terminal connected with the negative side of the generator and the other with one terminal of a regulating device indicated at 24 as a carbon pile. The opposite terminal of the carbon pile 24 is connected as by wire 25 with an insulated portion of a bell crank lever 26, pivotally supported as at 27 and having its short arm in electrical connection with and bearing upon one end of the carbon pile 28. The opposite end of the carbon pile is connected as by wire 29 with one terminal of any suitable regulating device, in this instance indicated as a carbon pile 30, the opposite end of which is connected as by wire 31 with the lead 4. The yielding contact device 32 is connected with the wire 29 as indicated and is adapted to cause electrical connection with the lever 26 when the carbon pile 28 is compressed and thus short-circuits the pile when the same has been sufficiently compressed.

The coil 3 surrounds a core of magnetic material 33 and when energized tends to lift the same evenly against the action of dashpot 34 so as to swing lever 35 and reduce the pressure upon the carbon pile 24 and increase the resistance thereof.

The lever 26 carries at one extremity the core of magnetic material 36, surrounded by the solenoid 37 which when energized tends to lift the same against the action of dashpot 38 so as to break the short circuit at 32—26 and increase the resistance of the carbon pile 28 by lowering the pressure thereupon.

The coil 37 has one terminal in communication with the lead 9 as shown, while its other terminal is connected with a wire 39, one end of which is connected with one terminal of the electro-magnet 40, the opposite terminal of which is connected with the contact member 41, carried upon an insulated extension of the lever 5. The wire 39 is also connected with one end of the winding of an electromagnet 42, the opposite terminal of which is flexibly connected with the insulated contacting member 43, also carried by the extension of the lever 5.

When the lever 5 is in the position shown in the drawing, the member 43 is in contact with the wiper 44, connected as by wire 45 with the contact member 46, carried by the metering device 10 as indicated. 47 is an indicating hand and contact making device adapted when in proper position to cause electrical contact with the member 46 and is electrically connected as by wire 48 with the lead 17. The member 47, if revolved in a right-handed direction from the position indicated in the drawing, causes contact with the contacting device 49 which is connected as by wire 50 with the wiper 51, adapted to come into contact with the member 41 if the lever 5 be swung in a right-handed direction into its other definite position.

The carbon pile 11 is compressed between two levers 52, pivotally supported as at 53 and having one extremity provided with sheaves or rollers indicated at 54 which engage the adjustable screws 55 carried at the extremities of the levers 56 pivotally supported as at 57 and having their opposite extremities pivotally connected as at 58 with the limbs 59 of a toggle joint which limbs are united at 60, which is a pivot rotatably connecting said limbs with a rod 61 held from lateral displacement by grooved sheaves 62. The rod 61 carries a core 78 of magnetic material surrounded by a solenoid or winding 63 in shunt across the translating circuit as by wires 64 and 65. When energized the coil 63 tends to raise the core 78 against the action of dashpot 80 so as to raise the knuckle 60 of the toggle joint comprising members 59 in such manner as to swing the levers 56 and lessen the pressure exerted by the screws 55 upon the sheaves 54 and thus lessen the pressure upon the pile 11, and the springs 66 will tend to swing the levers 52 and lessen the pressure upon the pile 11 until arrested by the adjustable screw 67, and then further upward movement of the core 62 will cause no change in the pressure upon the pile 11. This movement I use to regulate the pressure upon the carbon pile 30 through the instrumentality of the toggle joint lever mechanism comprising the limbs 68, the knuckle of which is engaged by an extension 69 shown in Fig. II. and carried by the adjustable sliding member 70, the position of which upon the rod 61 may be determined by manipulating the screw 77. The wire 71 is connected with the wire 64 and the wiper 72 which comes in contact with the member 73 when the lever 5 is swung into its other extreme position. The member 73 is flexibly connected with the wire 74 in communication with the lead 12.

The magnets or solenoids 40 and 42 are provided with plungers attached to the opposite ends of a spring indicated at 79, the central portion of which is anchored to the lever 5; and thus when one of the solenoids 40 or 42 is energized, the spring will be stretched toward the energized solenoid and tend to swing the lever 5, as will hereinafter more plainly appear.

In Fig. III. there is shown a coil 76 in series with the battery 18 which may be used in place of the coil 3 indicated in Fig. I., if desired.

An operation of my invention is substantially as follows:

If the generator be at rest or running at low speed, the switch 20 will be open and the translating devices 75, may be maintained by the storage battery 18, from which current will flow through lead 19, meter 10, lead 9, regulating element 11, lead 15, switch 16, and lead 15 to the devices 75 from which return is made through lead 17.

The metering device 10 is so arranged that current flowing from the battery 18 will cause the contacting and indicating hand 47 to revolve in a right-handed direction and indicate the current furnished by the battery. If current is supplied to the battery, the hand 47 will move in an opposite direction and indicate the current supplied to the battery. Details of the operating mechanism of the metering device are purposely omitted for the sake of clearness inasmuch as ampere-hour-meters suitable for this purpose are now well known in the art and articles commonly offered for sale. And it will be obvious that I may use a metering device which will move its contacting member 47 throughout a certain angular displacement per ampere-hour of charging current to the battery and move the said lever throughout the same distance when less than an ampere-hour is furnished by the battery; and, by properly adjusting the metering mechanism, I may cause the same to remain in step or phase with the condition of the battery, so to speak, in a manner now well known in the art.

If the hand 47 be in the position indicated in the drawing and sufficient current be supplied by the battery to the translating devices, the hand 47 will come in contact with the member 49 and rotate in contact therewith, and its position may indicate the current supplied by the battery until arrested by the stop 81 which may be used for this purpose if desired. When the member 47 is in contact with the member 49 and the lever 5 is in the position indicated in the drawing, the said contact between lever 47 and member 49 will cause no effect upon the system as the circuit from the lead 9 through coil 37, magnet 40, contact member 41, wiper 51, wire 50, contact 49, hand 47 and wire 48 will be broken at the contact 41—51 as indicated in the drawing.

If the generator have its voltage brought up until in excess of that of the storage battery, switch 20 will close and current will flow from the generator through lead 2, solenoid 3, lead 4, lever 5, contact 7, magnet 8 to lead 9 where it will divide and flow through meter 10, lead 19, storage battery 18, lead 17 and switch 20 to generator 1 and also through lead 9, pile 11, lead 15, translating devices 75 and lead 17 to the generator. The total output of the generator will not exceed a predetermined desired maximum as, I so arrange the instrumentalities coöperating with the carbon pile 24 that when a desired maximum current is reached, coil 3 will lift the core 33 smoothly against the action of dashpot 34 and increase the resistance of the carbon pile 24 in such manner as to control the excitation of the field coil 23 to prevent this maximum current from being exceeded. As the voltage upon the generator rises, the voltage upon the translating circuit will also tend to rise. And I so arrange the instrumentalities operated in response to fluctuations in the coil 63, which is across the translating circuit, that when the translating circuit voltage tends to exceed its predetermined operating value, the solenoid 63 will raise the core 78 smoothly against the action of dashpot 80 and raise the knuckle 60 of the toggle joint comprising members 59 and swing the pivots 58 of the levers 56 inwardly, which will swing the levers 56 about their pivotal supports 57 so as to move the adjustable screws 55 outwardly and allow the springs 66 to swing the levers 52 outwardly and relieve the pressure upon the carbon pile 11 and raise its resistance in such manner as to hold the translating circuit voltage from rising above its desired value. The more the generator tends to raise the translating circuit voltage, the more the core 78 will be raised; and when this action has inserted sufficient resistance in the carbon pile 11, usually a great deal in excess of the resistance required to produce proper drop between the battery and translating circuit, I so adjust the screws 67 that further elevation of the core 78 does not affect the pile 11 as the levers 52 come into contact with the screws 67, and elevation of the core 78 causes the screws 55 to move away from the sheaves 54 without affecting the pile 11. When this maximum resistance, as determined by the screws 67, has been inserted in the translating circuit, I so adjust the member 70 that any further rise in the plunger 78 will cause the member 69 to engage the knuckle of the toggle joint comprising members 68 and decrease the pressure upon the carbon pile 30 so as to cut down the field excitation of the generator and prevent its voltage from rising. The charging current flowing through the meter 10 will cause the indicator or hand 47 to rotate in a counter-clockwise direction so as to visibly indicate the charge being given to the battery; and when the battery has received a certain charge, as may be determined, I so adjust the metering mechanism that the member 47 will be brought into contact with the member 46, and then current will flow from the lead 9 through coil 37, wire 39, coil 42, contact 43—44, wire 45, contact 46, member 47 and wire 48 to the lead 17. The current in the magnet 42 will cause the same to attract its plunger and stretch the spring 79 in such direction as to tend to swing the lever 5 away from contact 7 and into contact with the member 14. The lever 5, however, will be restrained from moving so long as current flow from the generator through the winding 8, and the lever 5 will be held in the position shown in the drawing by the magnet 8 until the generator current is brought down to substantially or entirely zero. The current flowing through the solenoid 37 will cause the same to raise the core 36 smoothly against the action of dashpot 38 and first break the short-circuit at 32—26 so as to throw the pile 28 in series with the field winding 23 and then gradually increase the resistance of the pile 28 and cut down the generator field until the generator output in the coil 8 is substantially *nil* or until the main switch 20 opens, and then the coil 8 will release the lever 5 and the spring 79 will draw the lever 5 toward the contact 14 and the spring 6 will snap the same contact therewith and connect the lead 4 with the member 14 and simultaneously break the circuit at the contact 43—44, which will break the circuit through magnet 42 and also through solenoid 37 which will allow the core 36 to fall, gradually decreasing resistance 28 and causing the generator voltage to rise and the switch 20 to close and current to flow from the generator through the lead 4, contact 14, magnet 13, lead 12, lead 15, switch 16, translating devices 75 and lead 17 to the generator. The voltage of the generator will now tend to rise but will be restrained from increasing above that desired upon the translating circuit as the generator will now be connected directly with the translating circuit and regulated by the coil 63 across said circuit affecting the resistance 30. The resistance 11 will remain at its maximum, preventing back discharge of any appreciable value from the battery; while the translating current is furnished by the generator at a voltage below that of a fully charged battery and quite below that necessarily delivered by the generator when supplying current to the battery, and thus a considerable economy is effected. The moving of the lever 5 into contact with the member 14 establishes contact at 41—51 and also at 72—73. Any current now supplied by the battery will cause the hand 47 to move in a clockwise direction, and when a sufficient amount has been taken from the battery to cause the said hand 47 to come into contact with the member 49, which point is adjusted as one when it is desired that the battery shall again be connected for charging with the generator, current will then flow from the lead 9 through coil 37, magnet 40, contact 41—51, wire 50, contact 49—47, and wire 48 to the lead 17. The current flowing through the magnet 40 will stretch the spring 79 in such direction as to tend to swing the lever 5 back into the position shown in the drawing; but the lever 5 will be restrained from such movement so long as current be flowing from the generator through the magnet 13 and the current in the coil 37 will raise the core 36 and cut down the generator output by increasing resistance 28 until the said output reaches substantially *nil* or the switch 20 opens, when 13 will release the lever 5 and the magnet 40 will snap the same into the position shown in the drawing and break the circuit at 41—51 and thus interrupt the current through the coil 37 which will allow the core 36 to fall and raise the generator voltage until the generator again comes into action with the instrumentalities in the position shown in the drawing, when the generator will charge the battery and deliver current to the translating devices as first above outlined. When the generator has had its connection shifted from across the battery circuit to connection directly with the translating circuit, that is, when it has had its connection shifted from one side of the regulator 11 to the other and the lever 5 assumes the position opposed to the one shown in the drawing, the connection caused by contact 72—73 places the coil 63 across the generator through the instrumentality of wires 71 and 74, even though the translating circuit be broken at the switch 16, and thus the voltage of the generator will not rise above the ordinary translating voltage which will be impressed upon the coil 63 even though no translating devices be in circuit.

I do not wish in any way to limit myself to any of the exact constructions, or details of devices, or modes of operation above outlined to show concrete cases merely embodying the essentials of my invention, which is as set forth in the following claims:

1. The combination with a source of electrical potential difference, a storage battery circuit, a translation circuit, and means for connecting the source under certain conditions with the battery circuit and under other conditions with the translation circuit, of means coöperating with the last named means to affect the source.

2. The combination with a source of electrical potential difference, a storage battery circuit, a translation circuit and means for connecting the source with the battery circuit under certain conditions and with the translation circuit under other conditions of automatic means coöperating with the last named means to affect the source.

3. The combination with a source of electrical potential difference, a storage battery circuit and a translation circuit, of means for connecting the source with the battery circuit under certain conditions and with the translation circuit under other conditions, means for determining which of said connections shall be made, and means coöperating therewith to affect the source, and regulating means for controlling the source.

4. The combination with a source of electrical potential difference, a storage battery circuit and a translation circuit, of means for connecting the source with the battery circuit under certain conditions and with the translation circuit under other conditions, means for determining which of said connections shall be made, means coöperating therewith to affect the source and regulating means for controlling the source responsive to voltage fluctuations, and regulating means responsive to current fluctuations affecting said source.

5. The combination with a source of electrical potential difference, a storage battery circuit and a translation circuit, of means for connecting the source with the battery circuit under certain conditions and with the translation circuit under other conditions, means for determining which of said connections shall be made depending upon the condition of the battery, means coöperating therewith to affect the source, and independent means for regulating the source.

6. The combination with a source of electrical potential difference, a storage battery circuit and a translation circuit, of means for connecting the source with the battery circuit under certain conditions and with the translation circuit under other conditions, means for determining which of said connections shall be made depending upon the condition of the battery, means coöperating therewith to affect the source, and independent means for regulating the source responsive to current fluctuations.

7. The combination with a source of electrical potential difference, a storage battery circuit and a translation circuit, of means for connecting the source with the battery circuit under certain conditions and with the translation circuit under other conditions, means for determining which of said connections shall be made depending upon the condition of the battery, means coöperating therewith to affect the source, and independent means for regulating the source responsive to voltage fluctuations.

8. The combination with a source of electrical potential difference, a storage battery circuit and a translation circuit, of means for connecting the source with the battery circuit under certain conditions and with the translation circuit under other conditions, means for determining which of said connections shall be made depending upon the condition of the battery, means coöperating therewith to affect the source, and independent means for regulating the source responsive to voltage and current fluctuations.

9. The combination with a source of electrical potential difference, a storage battery circuit and a translation circuit, of means for connecting the source with the battery circuit under certain conditions and with the translation circuit under other conditions, means for determining which of said connections shall be made depending upon the amount of current supplied to the battery, means coöperating therewith to affect the source, and independent means for regulating the source.

10. The combination with a source of electrical potential difference, a storage battery circuit and a translation circuit, of means for connecting the source with the battery circuit under certain conditions and with the translation circuit under other conditions, means for determining which of said connections shall be made depending upon the amount of current supplied to the battery, means coöperating therewith to affect the source, and independent means for regulating the source responsive to voltage fluctuations.

11. The combination with a source of electrical potential difference, a storage battery circuit and a translation circuit, of means for connecting the source with the battery circuit under certain conditions and with the translation circuit under other conditions, means for determining which of said connections shall be made depending upon the amount of current supplied to the battery, means coöperating therewith to affect the source, and independent means for regulating the source responsive to current fluctuations.

12. The combination with a source of electrical potential difference, a storage battery circuit and a translation circuit, of means for connecting the source with the battery circuit under certain conditions and with the translation circuit under other conditions, means for determining which of said connections shall be made depending upon the amount of current supplied to the battery, means coöperating therewith to affect the source, and independent means for regulating the source responsible to voltage and current fluctuations.

13. The combination with a source of electrical potential difference, a storage battery circuit and a translation circuit, of means for connecting the source with the battery circuit under certain conditions and with the translation circuit under other conditions, means for determining which of said connections shall be made depending upon the amount of current supplied to the battery and affecting the source during the changes of connections, and independent means for controlling the source.

14. The combination with a source of electrical potential difference, a storage battery circuit and a translation circuit, of means for connecting the source with the battery circuit under certain conditions and with the translation circuit under other conditions, means for determining which of said connections shall be made depending upon the amount of current supplied to the battery and affecting the source during the changes of connections, and independent means for controlling the source responsive to voltage fluctuations.

15. The combination with a source of electrical potential difference, a storage battery circuit and a translation circuit, of means for connecting the source with the battery circuit under certain conditions and with the translation circuit under other conditions, means for determining which of said connections shall be made depending upon the amount of current supplied to the battery and affecting the source during the changes of connections, and independent means for controlling the source responsive to current fluctuations.

16. The combination with a source of electrical potential difference, a storage battery circuit and a translation circuit, of means for connecting the source with the battery circuit under certain conditions and with the translation circuit under other conditions, means for determining which of said connections shall be made depending upon the amount of current supplied to the battery and affecting the source during the changes of connections, and independent means for controlling the source responsive to voltage and current fluctuations.

17. The combination with a source of electrical potential difference, a storage battery circuit and a translation circuit, of means for connecting the source with the battery circuit under certain conditions and with the translation circuit under other conditions, means for determining which of said connections shall be made, means cooperating therewith to affect the source, and regulating means for controlling the source responsive to voltage fluctuations across the translation circuit, and regulating means responsive to current fluctuations affecting said source.

18. The combination with a source of electrical potential difference, a storage battery circuit and a translation circuit, of means for connecting the source with the battery circuit under certain conditions and with the translation circuit under other conditions, means for determining which of said connections shall be made depending upon the condition of the battery, means cooperating therewith to affect the source, and independent means for regulating the source responsive to voltage fluctuations across the translation circuit.

19. The combination with a source of electrical potential difference, a storage battery circuit and a translation circuit, of means for connecting the source with the battery circuit under certain conditions and with the translation circuit under other conditions, means for determining which of said connections shall be made depending upon the condition of the battery, means cooperating therewith to affect the source, and indepenedent means for regulating the source responsive to voltage fluctuations across the translation circuit and current fluctuations.

20. The combination with a source of electrical potential difference, a storage battery circuit and a translation circuit, of means for connecting the source with the battery circuit under certain conditions and with the translation circuit under other conditions, means for determining which of said connections shall be made depending upon the amount of current supplied to the battery, means cooperating therewith to affect the source, and independent means for regulating the source responsive to voltage fluctuations across the translation circuit.

21. The combination with a source of electrical potential difference, a storage battery circuit and a translation circuit, of means for connecting the source with the battery circuit under certain conditions and with the translation circuit under other conditions, means for determining which of said connections shall be made depending upon the amount of current supplied to the battery, means cooperating therewith to affect the source, and independent means for regulating the source responsive to voltage fluctuations across the translation circuit and current fluctuations.

22. The combination with a source of electrical potential difference, a storage battery circuit and a translation circuit, of means for connecting the source with the battery circuit under certain conditions and with the translation circuit under other conditions, means for determining which of said connections shall be made depending upon the amount of current supplied to the battery and affecting the source during the changes of connection, and independent means for controlling the source responsive to voltage fluctuations across the translation circuit.

23. The combination with a source of electrical potential difference, a storage battery circuit and a translation circuit, of means for connecting the source with the battery circuit under certain conditions and with the translation circuit under other conditions, means for determining which of said connections shall be made depending upon the amount of current supplied to the battery and affecting the source during the changes of connections, and independent means for controlling the source responsive to voltage fluctuations across the translation circuit and current fluctuations.

24. The combination with a source of electrical potential difference, a storage battery circuit and a translation circuit, of means for connecting the source with the battery circuit under certain conditions and with the translation circuit under other conditions, a regulator for the translation circuit responsive to voltage fluctuations, and means whereby the same affects the source.

25. The combination with a source of electrical potential difference, a storage battery circuit and a translation circuit, of means for connecting the source with the battery circuit under certain conditions and with the translation circuit under other conditions, a regulator for the translation circuit responsive to voltage fluctuations, and means whereby the same affects the source when the source is connected with the translation circuit.

26. The combination with a source of electrical potential difference, a storage battery circuit, a translation circuit, and means for connecting the source with the battery circuit under certain conditions and with the translation circuit under other conditions, means for regulating the translation circuit, voltage responsive means for operating the same, and means whereby said responsive means controls the source.

27. The combination with a source of electrical potential difference, a storage battery circuit, a translation circuit, and means for connecting the source with the battery circuit under certain conditions and with the translation circuit under other conditions, means for regulating the translation circuit, voltage responsive means for operating the same, and means whereby said responsive means controls the source when the source is connected with the translation circuit.

28. The combination with a source of electrical potential difference, a storage battery, a battery circuit, translation devices and a translating circuit, of a regulator between the battery circuit and the translating circuit, automatic means for connecting the source upon opposite sides of said regulator, and means responsive to voltage fluctuations for controlling said regulator and affecting the operation of the source.

29. The combination with a source of electrical potential difference, a storage battery circuit and a translation circuit, means for connecting the source with the battery circuit under certain conditions and with the translation circuit under other conditions, a regulator for the translation circuit responsive to voltage fluctuations and means whereby the same affects the source when the source is connected with the translation circuit, a switch controlling the translation circuit, and means whereby the source is regulated in response to fluctuations on opposite sides of said switch.

30. The combination with a source of electrical potential difference, a storage battery circuit and a translation circuit, means for connecting the source with the battery circuit under certain conditions and with the translation circuit under other conditions, a regulator for the translation circuit responsive to voltage fluctuations and means whereby the same affects the source when the source is connected with the translation circuit, a switch controlling the translation circuit, and means whereby the source is regulated in response to fluctuations on opposite sides of said switch, depending upon whether the source is connected with the battery circuit or the translation circuit.

JOHN L. CREVELING.

---

It is hereby certified that in Letters Patent No. 1,332,610, granted March 2, 1920, upon the application of John L. Creveling, of White Plains, New York, for an improvement in "Electric Systems," errors appear in the printed specification requiring correction as follows: Page 2, line 115, after the reference-numeral "75" insert a comma; page 4, line 1, after the word "same" insert the word *into;* same page, line 101, claim 2, after the word "conditions" insert a comma; page 5, line 95, claim 12, for the word "responsible" read *responsive;* and that the said Letters Patent should be read with these corrections therein that the same may conform to the record of the case in the Patent Office.

Signed and sealed this 6th day of April, A. D., 1920.

[SEAL.]

M. H. COULSTON,

*Acting Commissioner of Patents.*

Cl. 171—313.